(12) United States Patent
Joyce

(10) Patent No.: US 10,384,374 B2
(45) Date of Patent: Aug. 20, 2019

(54) SYSTEM AND METHOD FOR REDUCING THREE-DIMENSIONAL ADDITIVE MANUFACTURING PRODUCTION TIME

(71) Applicant: B9CREATIONS, LLC, Rapid City, SD (US)

(72) Inventor: Michael Joyce, Rapid City, SD (US)

(73) Assignee: B9CREATIONS, LLC, Rapid City, SD (US)

( * ) Notice: Subject to any disclaimer, the term of this patent is extended or adjusted under 35 U.S.C. 154(b) by 0 days.

(21) Appl. No.: 15/417,493

(22) Filed: Jan. 27, 2017

(65) Prior Publication Data

US 2018/0361679 A1 Dec. 20, 2018

Related U.S. Application Data

(60) Provisional application No. 62/352,413, filed on Jun. 20, 2016.

(51) Int. Cl.
| | |
|---|---|
| *B33Y 50/02* | (2015.01) |
| *B29C 35/08* | (2006.01) |
| *B29C 67/00* | (2017.01) |
| *B33Y 70/00* | (2015.01) |
| *B33Y 10/00* | (2015.01) |
| *B33Y 30/00* | (2015.01) |

(Continued)

(52) U.S. Cl.
CPC ........ *B29C 35/0805* (2013.01); *B29C 64/124* (2017.08); *B29C 64/129* (2017.08); *B29C 64/386* (2017.08); *B29C 64/40* (2017.08); *B29C 67/00* (2013.01); *B33Y 10/00* (2014.12); *B33Y 30/00* (2014.12); *B33Y 50/00* (2014.12); *B33Y 50/02* (2014.12); *B33Y 70/00* (2014.12)

(58) Field of Classification Search
CPC ............ B29C 67/0062; B29C 67/0066; B29C 67/007
See application file for complete search history.

(56) References Cited

U.S. PATENT DOCUMENTS

| 5,122,441 A | * | 6/1992 | Lawton | ................. B33Y 10/00 156/58 |
|---|---|---|---|---|
| 2013/0292862 A1 | | 11/2013 | Joyce | |

(Continued)

OTHER PUBLICATIONS

Mark, James E.. (2009). Polymer Data Handbook (2nd Edition). Oxford University Press. Online version available at: http://app.knovel.com/hotlink/toc/id:kpPDHE0004/polymer-data-handbook/polymer-data-handbook.*

(Continued)

*Primary Examiner* — Galen H Hauth
(74) *Attorney, Agent, or Firm* — Terry M. Sanks, Esq.; Beusse Wolter Sanks & Maier, PLLC

(57) ABSTRACT

A system for releasing an additive manufactured part from a build location is disclosed having a cure inhibitor transport system to resupply a cure inhibitor at a cure inhibited photopolymer resin layer where the additive manufactured part is built, the transport system comprises a cure inhibiting reservoir to initially hold the cure inhibitor, a cure inhibiting distributor layer adjacent to the cure inhibiting reservoir through which the cure inhibitor passes from the cure inhibitor reservoir to the cure inhibited photopolymer resin layer and into the adjacent photopolymer creating a cure inhibited photopolymer resin layer. Another system and method are also disclosed.

19 Claims, 8 Drawing Sheets

(51) Int. Cl.
    *B33Y 50/00*         (2015.01)
    *B29C 64/124*      (2017.01)
    *B29C 64/129*      (2017.01)
    *B29C 64/386*      (2017.01)
    *B29C 64/40*       (2017.01)

(56) References Cited

U.S. PATENT DOCUMENTS

| | | |
|---|---|---|
| 2015/0102532 A1 | 4/2015 | DeSimone et al. |
| 2015/0360419 A1* | 12/2015 | Willis ............... B29C 67/0085 425/174.4 |
| 2016/0046072 A1* | 2/2016 | Rolland ............ B29C 67/0066 264/401 |
| 2016/0160077 A1 | 6/2016 | Rolland et al. |

OTHER PUBLICATIONS

Silicon.pro, "A Guide to Shore Durometers," Jan. 12, 2015, retrieved May 4, 2017, http://www.silicone.pro/2015/01/guide-shore-durometers, p. 1.
Cidra Precisions, "Polydimethylsiloxane (PDMS)," Nov. 17, 2015, retrieved May 4, 2017, https://web.archive.org/web/20151117032952/http://cidraprecisionservices.com/life-sciences-materials-pdms.html, pp. 1-2.
International Search Report, dated May 26, 2017.
The Chemours Company FC, LLC, "Teflon™ AF Amorphous Fluoroplastic Resins," C-10233 (Sep. 2016).

\* cited by examiner

400

410 Determining at least one of a lift speed and a speed schedule for the part after a new part layer is applied, the maximum lift speed is based on at least one of a total geometry of the part, a geometry of at least one layer previously applied, and the geometry of at least one layer to be applied and moving the build table upward at the speed or schedule determined with the lifting device

OR

420 Determining a minimum lift height of a part being built with an additive manufacturing device after a part layer is applied, the minimum lift height is based on at least one of the total geometry of the part, geometry of at least one layer previously applied, and a geometry of at least one layer to be applied and moving the build table in an upward direction of the minimum lift height determined with a lifting device

OR

430 Determining a minimum release time once the part is raised to the minimum release height, the minimum release time is based on at least one of the total geometry of the part, the geometry of at least one layer previously applied, and the geometry of at least one layer to be applied, and delaying repositioning of the build table to the next layer application position until the determined release time has expired.

OR

440 Determining a maximum lowering speed of the part, the maximum lowering speed is based on at least one of the total geometry of the part, the geometry of at least one layer preciously applied, and geometry of at least one layer to be applied

OR

450 Determining a minimum settle time once the part is repositioned for the next layer application, the minimum settle time is based on at least one of the total geometry of the part, the geometry of at least one layer previously applied, and the geometry of at least one layer to be applied, and delaying directing electromagnetic radiation until the settle time has expired

FIG. 4

SYSTEM AND METHOD FOR REDUCING THREE-DIMENSIONAL ADDITIVE MANUFACTURING PRODUCTION TIME

CROSS-REFERENCE TO RELATED APPLICATIONS

This application claims the benefit of U.S. Provisional Application No. 62/352,413 filed Jun. 20, 2016, and incorporated herein by reference in its entirety.

BACKGROUND

Additive manufacturing devices produce three-dimensional parts from feedstock by, according to part creation instructions, sequentially adding materials to a part being formed. Additive manufacturing enables quick, easy, precise, and repeatable creation of a variety of objects.

Fused filament fabrication additive manufacturing devices, also known as fused deposition modeling printers, create parts via depositing melting filament in a raster pattern. Such devices can generally only produce parts having a resolution of 150 to 300 microns at sizes fewer than two feet per side. At such scales, part creation times are significant due to the raster movement of the filament extruder. Furthermore, such filaments are not suitable for well-known techniques such as lost wax casting and also produce a part which is prone to losing portions of itself due to strands of filament coming off because of poor bonding between adjacent strands of filament.

Photopolymer-based additive manufacturing devices are capable of generating parts having a higher feature resolution, often measured in the 10s of microns. Such parts may also be used in lost wax casting processes. Photopolymer-based additive manufacturing devices typically comprise a movable build plate, a controllable light source, a photopolymer supply (e.g., a vat of photopolymer) and a build area where photopolymer from the photopolymer supply is selectively cured, forming portions of the part being created. The part is connected to the build plate as it is created. Each newly created portion of the part (e.g., a layer) adheres to the build area as it is created, necessitating separation of the part from the build area by applying a separation force. This may be accomplished by peeling, pulling, sliding or other movements. In some cases, the separation force is strong enough to distort or destroy fragile portions of a part because the fragile portion is stretched, strained, and even completely separated from the part as the part is repositioned to form the next layer of the part. Because this separation force destroys or damages fine detailing in a desired part design, quality is limited.

Each newly formed layer must be separated from the build area surface before additional photopolymer material may be deposited (by flowing, deposition or otherwise supplying the material), exposed to electromagnetic radiation and added to the part. Bonding and/or vacuum forces may connect the newly formed portion of the part to the build area surface. These forces must be overcome in a manner which does not damage the part being created, thereby establishing a minimum feature size and maximum print speed.

Many prior art additive manufacturing devices use either at least a slide motion or tilt motion to release a part being built during the build process to separate it from a build table so that a next layer to the part may be applied. These motions are required to minimize destructive forces on the part being built. One known prior art approach uses both a lift and slide motion that occurs at a same time, or simultaneously, to assist in release of the part from the build table. Providing any of these motions requires an additional powered release mechanism to be a part of the additive manufacturing device and increases the length of time required to form the part.

Pulling a part being formed vertically upward from a build area is known and a need for an additional powered release mechanism is not needed. Prior art attempts to only vertically lift the part have proven to take longer when compared to employing a slide or tilt motion. How far to lift the part and at what rate to lift the part to reliably produce a part are unknown. To compensate, such prior art systems that utilize vertical lift only compromise to avoid damage by providing a slow lift rate to a high height to ensure no damage occurred where rate and height are static for any part build.

Though the additive manufacturing process described above is considered rapid manufacturing, there are several inefficiencies in the process and known additive manufacturing devices which could be improved upon to further enhance the processing speed. Given the foregoing, users of such devices would benefit from an additive manufacturing device which facilitates a more rapid and efficient operation that would result in improved manufacturing time.

SUMMARY

Embodiments relate to a system and a method to provide for a more rapid processing time realized with an additive manufacturing device. The system comprises a cure inhibitor transport system to resupply a cure inhibitor at a cure inhibited photopolymer resin layer where the additive manufactured part is built, the transport system comprises a cure inhibiting reservoir to initially hold the cure inhibitor, a cure inhibiting distributor layer adjacent to the cure inhibiting reservoir through which the cure inhibitor passes from the cure inhibitor reservoir to the cure inhibited photopolymer resin layer and into the adjacent photopolymer creating a cure inhibited photopolymer resin layer.

Another system comprises a surface that provides a reference plane, a deformable layer adjacent to the surface, a cure inhibiting reservoir adjacent to the deformable layer, and a cure inhibiting distributor layer adjacent to the cure inhibiting reservoir.

The method comprises maintaining a supply of a cure inhibitor at cure inhibiting reservoir that is a part of an additive manufacturing device. The method also comprises dispersing the cure inhibitor into a cure inhibiting distributor layer, the cure inhibiting distributor layer is in communication with the cure inhibiting reservoir and the cure inhibitor passes into a plurality of channels in the cure inhibiting distributor layer. The method further comprises producing the additive manufactured part by operation of the additive manufacturing device.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 4 is a flowchart illustrating an embodiment of a method for improving an efficiency of an additive manufacturing device;

DETAILED DESCRIPTION

Figure 1:
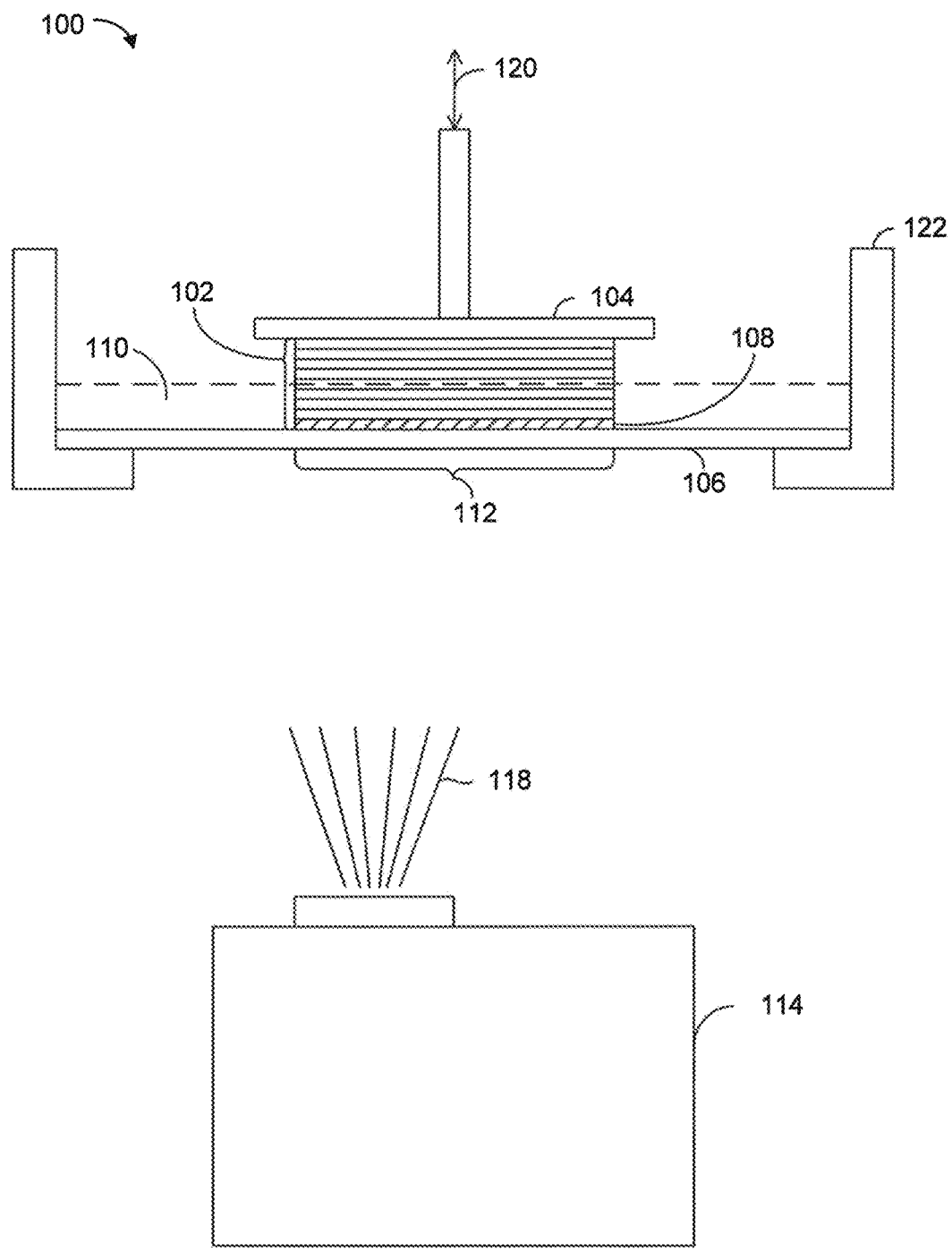
FIG. 1 shows a schematic side view of an embodiment of an additive manufacturing device.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

FIG. 1 shows a schematic side view of an embodiment of an additive manufacturing device. The additive manufacturing device 100 is provided to construct a part 102 by curing photopolymer resin 110 via exposure to the electromagnetic radiation 118 from a light source 114 or radiation source. The electromagnetic radiation source 114 such as, but not limited to, a projector, is positioned such that its emissions pass through a transmissive part of a build plate 106, or reference plate, to cure a photopolymer material 110 within a build area 112 located above the build plate 106. The electromagnetic radiation 118 may be provided in a pattern which causes a photopolymer layer 108 to harden into a new portion of the part 102, thereby constructing the part 102 portion-by-portion (e.g., in a layer-wise fashion).

During construction, the part 102 is attached to a build table 104. The build table 104 supports the part 102 as the part 102 is being constructed. The build table 104 may comprise a planar, movable surface attached to an actuator 120. The actuator 120 may vertically raise and lower the part 102 in a step-wise fashion during construction such that additional layers may be added to the part 102. When lowered, the part 102 may leave a gap for formation of the next layer 108. After formation of the next layer, the next layer may rest on a cure inhibited layer 240, discussed further herein.

The additive manufacturing device 100 may also comprise a vat 122. The build plate 106 may form at least a portion of the bottom portion of the vat 122. The vat 122 houses photopolymer resin 110 that is used to create the part 102 as disclosed herein.

The build plate 106 may be wholly or partially optically transparent. Portions of the part 102 are cured by light 118 passing through portions of the build plate 106.

Figure 2:
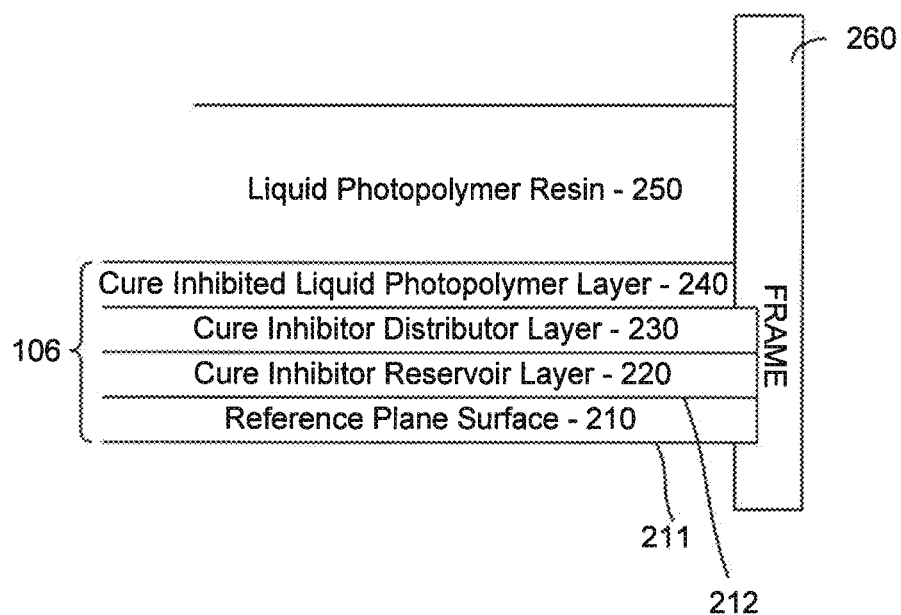
FIG. 2 shows a block diagram illustrating an embodiment of a cross section of the build location.

FIG. 2 shows a block diagram illustrating an embodiment of a cross section of the build plate. The build plate 106 is part of an assembler device for constructing a three-dimensional part in a layer-wise fashion where the part is made of a resin that is hardened when energy is emitted through the imaging component. The build plate 106 comprises a transparent image plate 210 that is at least one of rigid and semi rigid. The plate 210 has a top image plate surface 212 and a bottom image plate surface 211. The bottom image plate surface 211 is on a side where the energy source 114 is located. A cure inhibiting reservoir 220 is located adjacent to the top surface 212 of the plate 210. A cure inhibiting distributor layer 230 is located adjacent to the cure inhibiting reservoir 220. A cure inhibiting photopolymer resin layer 240 is located adjacent to the cure inhibiting distributor layer 230. The cure inhibiting photopolymer resin layer 240 may be created, in part, from a cure inhibitor that is provided from the cure inhibited reservoir 220. The cure inhibitor passes through the cure inhibiting distributor layer 230 into the cure inhibited polymer resin layer 240.

The plate 210 may be transparent. More specifically, as illustrated in FIG. 1, the plate 210 may provide for illumination by a light source 114 to pass through the plate 210. As a non-limiting example, the plate 210 may be made of Borofloat® glass, due to its high ultraviolet light transmissivity properties.

The cure inhibiting reservoir 220 may comprise a film or coating permeable by the cure inhibitor. As a non-limiting example, oxygen may be the cure inhibitor. Another gas, or gas combination may also be provided as the cure inhibitor. The cure inhibiting reservoir 220 may be attached to a top side of the plate 210. As a non-limiting example, the cure inhibiting reservoir may comprise polydimethylsiloxane ("PDMS"). In another non-limiting example, the cure inhibiting reservoir 220 may have a durometer between Shore 00 0 and Shore A 43. The cure inhibiting reservoir 220 provides for a cure inhibitor such as, but not limited to, oxygen, to be dissolved within the material of the cure inhibiting reservoir 220. The cure inhibitor naturally disburses within the reservoir 220.

The cure inhibiting distributor layer 230 may comprise a plurality of channels or cavities, micro or nano channels or cavities, through which the cure inhibitor may pass to reach the cure inhibited photopolymer resin layer 240. As a non-limiting example, the cure inhibiting distributor layer 230 may comprise Teflon® AF2400 as provided by The Chemours Company. Those skilled in the art know that Teflon® AF2400 is an amorphous fluoroplastic with an oxygen permeability of 700 Barrer and glass transition temperature of 200 degrees Celsius.

The cure inhibited photopolymer resin layer 240 may comprise uncured photopolymer resin impregnated with the cure inhibitor. Since a part being manufactured may only require certain segments to receive an additional additive layer during any particular application, the cure inhibitor may freely move to an area within at least one of the cure inhibiting reservoir 220, cure distributor layer 230, and cure inhibited photopolymer resin layer 240 where a depletion of cure inhibitor may occur during the build process.

Figure 3:
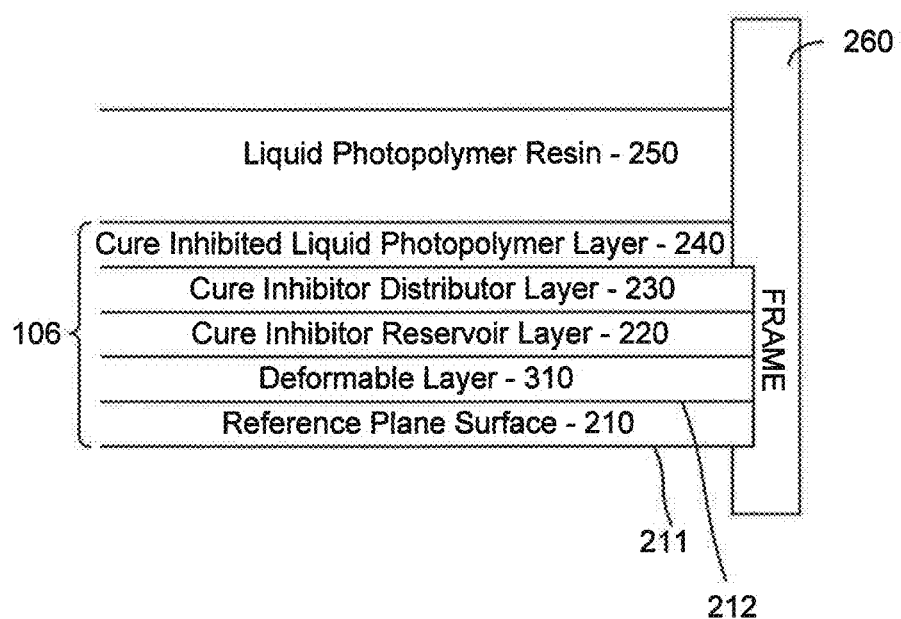
FIG. 3 shows another embodiment of a block diagram illustrating an embodiment of a cross section of the build location.

FIG. 3 shows another embodiment of a block diagram illustrating an embodiment of a cross section of the build location. As shown, a deformable layer 310 is located between the plate 210 and the cure inhibitor reservoir layer 220. The deformable layer 310 comprises a low durometer optically transparent gel that has a durometer that less than Shore A 45. In a non-limiting example, the gel may be a gel manufactured by Silicone Solutions of Cuyahoga Falls, Ohio, and marketed as SS-6080, that has a durometer of Shore 00 0. As used herein, the deformable layer 310 layer has a durometer less than a durometer of the cure inhibitor reservoir 220 and a durometer of the cure inhibiting distributor layer 230. In an embodiment, each component has a different durometer of Shore hardness rating.

As shown in FIGS. 2 and 3, a securing element 260 may be provided. As shown in FIG. 2, the securing element 260 may be used to attach the reference plane surface 210 to the cure inhibitor reservoir layer 220. As further shown in FIG. 2, the securing element 260 may also hold in place the cure inhibitor distributor layer 230. The cure inhibited liquid photopolymer layer 240 may also be secured or attached to the securing element 260. As shown in FIG. 3, the securing element 260 may hold in place the deformable layer 310, cure inhibiting reservoir, cure inhibiting distributor layer and surface. More specifically, the securing element may hold in place the deformable layer 310, cure inhibiting reservoir 220, and cure inhibiting distributor layer 230 to the surface 210. The securing element may be a frame 260. The frame 360 may be located along at least one edge of the cure inhibitor transport system and the reference plane to secure the cure inhibitor transport system and the reference plane in place with respect to each other. More specifically, the frame 360 may be located along at least one edge of the reference plane surface 210 to attach it to the cure inhibitor reservoir layer 220 (as shown in FIG. 2) or along at least one edge of the reference plane surface 210 and deformable layer 310. Those skilled in the art will recognize that other ways to utilize the securing element 260 are possible.

Processing speed of the additive manufacturing device may be further increased where sizing information about a part being built is evaluated either real-time during the build process or pre-calculated to determine a rate and a distance of lifting the part from the build plate and returning the part to the build plate. As a non-limiting example, pre-calculating may be used prior to creating first part when a plurality of identical parts is to be made. As a non-limiting example with respect to a real-time calculation procedure, as a part layer is being applied, a calculation may be performed for a subsequent part to be made. In either embodiment, a part's geometry may be factored in to determine both the rate of a vertical release, height of a vertical release and duration of delaying the part during build to another dose of radiation energy. Thus, the rate may be variable, meaning that the speed of lifting, and even lowering, may vary during the lift phase. This means that the lift, or lowering, of the part may start at a first speed and then accelerate or decelerate to another speed.

FIG. 4 shows a flowchart illustrating an embodiment of a method. The method 400 may comprise at least one of any of steps which may function individually or collectively in any combination. The method 400 may comprise determining at least one of a lift speed and a speed schedule for the part after a new part layer is applied, the maximum lift speed is based on at least one of a total geometry of the part, a geometry of at least one layer previously applied, and the geometry of at least one layer to be applied and moving the build table upward at the speed or schedule determined with the lifting device, at 410. As a non-limiting example, the speed schedule may vary the speed during movement.

Another element of the method 400 may comprise determining a minimum lift height of a part being built with an additive manufacturing device after a part layer is applied, the minimum lift height is based on at least one of the total geometry of the part, geometry of at least one layer previously applied, and a geometry of at least one layer to be applied and moving the build table in an upward direction to the minimum lift height determined with a lifting device, at 420. Another element of the method 400 may also comprise determining a minimum release time once the part is raised to the minimum release height, the minimum release time is based on at least one of the total geometry of the part, the geometry of at least one layer previously applied, and the geometry of at least one layer to be applied, and delaying repositioning of the build table to the next layer application position until the determined release time has expired, at 430.

Another element of the method 400 may further comprise determining a maximum lowering speed of the part, the maximum lowering speed is based on at least one of the total geometry of the part, the geometry of at least one layer previously applied, and the geometry of at least one layer to be applied, at 440. The lowering speed may also have a lowering speed schedule.

Another element of the method 400 may also comprise determining a minimum settle time once the part is repositioned for the next layer application, the minimum settle time is based on at least one of the total geometry of the part, the geometry of at least one layer previously applied, and the geometry of at least one layer to be applied, and delaying directing electromagnetic radiation until the determined settled time has expired, at 450.

Information pertaining to the geometry of the part may be determined based on the image file that is being used to create the part. The lifting height, speed and minimum release time may be based on an inflow rate of the photopolymer resin beneath the part layer created, when it is raised, to allow the resin to cover the inflow distance needed to replenish the build plate.

The minimum settle time determination, at 440, may also comprise identifying a worse case overhang occurrence for the part. The minimum settle time may determine how long to wait before the radiation source is activated again once the part is lowered back onto the build plate to squeeze out the excess resin. This calculation may be needed when a new layer to be applied has a larger surface area, or build area, than the previous layer created. Due to the thinness of the larger surface area layer, returning it to the build table may result in the part of this larger surface area that is of a same size as the previous created layer reaching a desire position first as the surface area without support from the previous build layer possibly being bent upward before it eventually reaches the desired position. Thus, the unsupported surface area may take longer to squeeze out excess resin. Failure to provide sufficient time to squeeze out the excessive resin may create distortions in the part.

Figure 5:
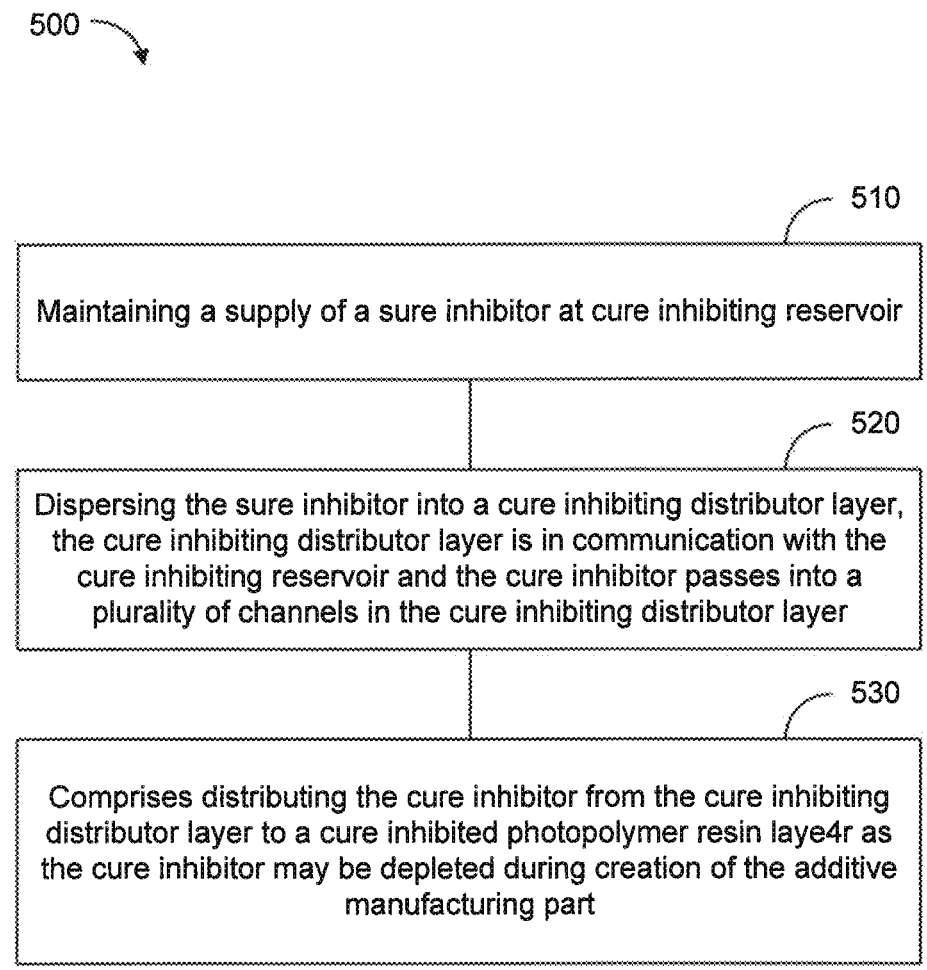
FIG. 5 is a flowchart illustrating an embodiment of a method for improving an efficiency of an additive manufacturing device.

FIG. 5 shows a flowchart illustrating an embodiment of a method. The method 500 comprises maintaining a supply of a cure inhibitor at cure inhibiting reservoir, at 510. The method 500 further comprises dispersing the cure inhibitor into a cure inhibiting distributor layer, the cure inhibiting distributor layer is in communication with the cure inhibiting reservoir and the cure inhibitor passes into a plurality of channels in the cure inhibiting distributor layer, at 520. The method also comprises distributing the cure inhibitor from the cure inhibiting distributor layer to a cure inhibited photopolymer resin layer as the cure inhibitor may be depleted during creation of the additive manufacturing part, at 530.

Figure 6:
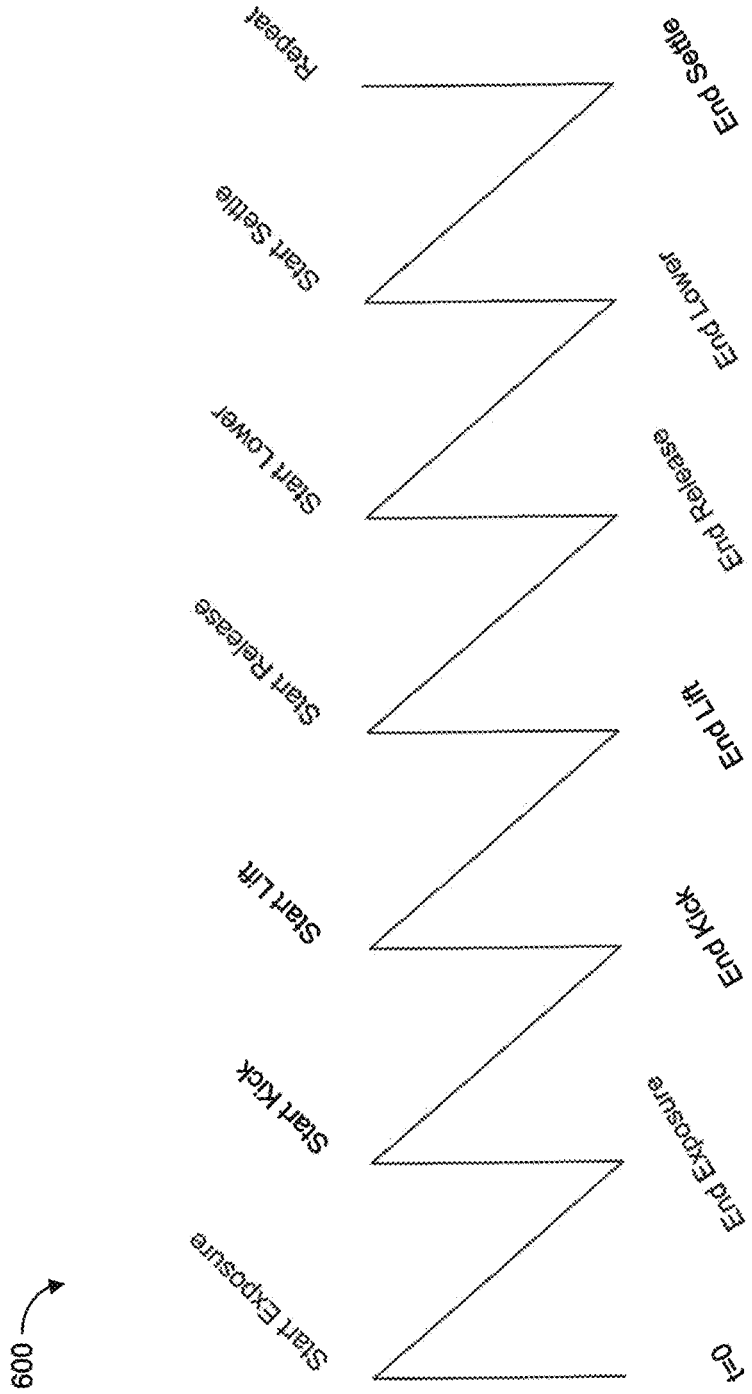
FIG. 6 shows a timeline illustrating an embodiment of the method disclosed in either FIG. 4 or FIG. 7.
Figure 7:
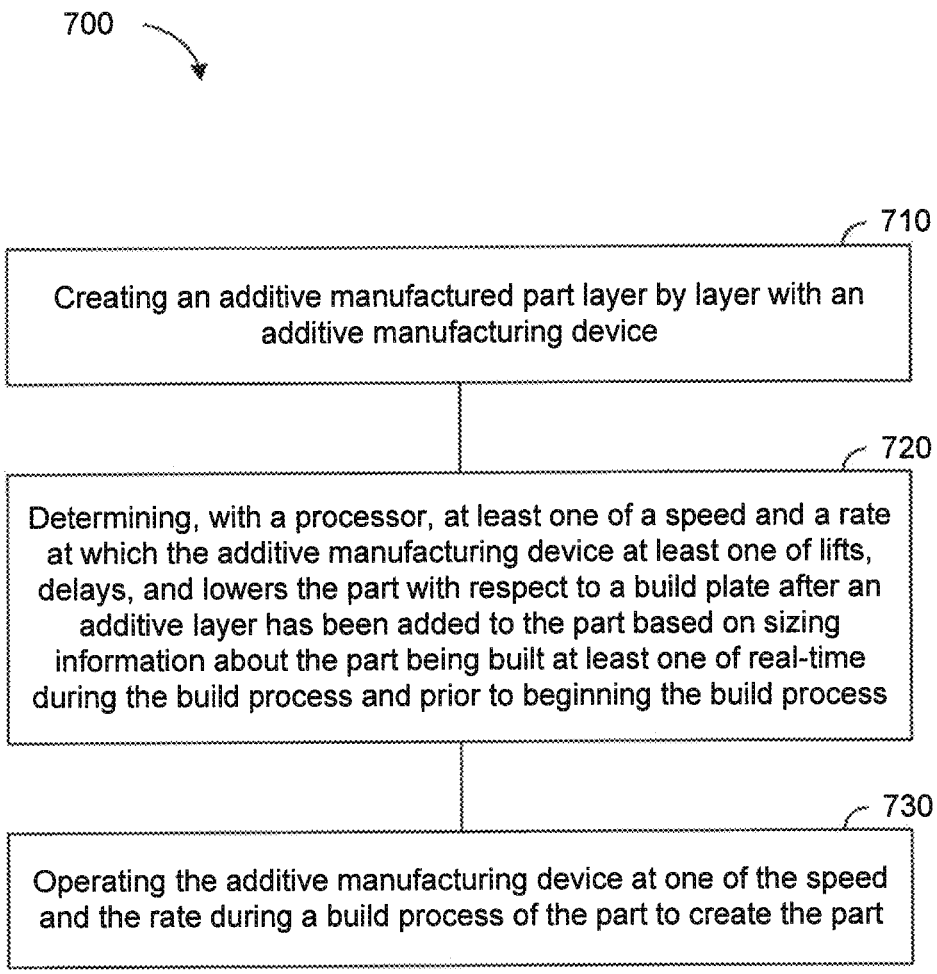
FIG. 7 is a flowchart illustrating another embodiment of a method for improving an efficiency of an additive manufacturing device.

FIG. 6 shows a timeline illustrating an embodiment of the method disclosed in either FIG. 4 or FIG. 7. The timeline 600 begins at t=0 where exposure of the part to the electromagnetic radiation occurs. Next, exposure to the electromagnetic radiation ends. Unlike the other time durations disclosed herein, exposure time is dependent upon a material's characteristics. Energizing of the photopolymer resin material occurs, namely, continues to occur for an amount of time after the electromagnetic radiation is turned off, and is identified as "start kick" which occurs at "end exposure." "End kick" occurs when solidification of the material stops. "Start lift" occurs, at the speed schedule to the minimum height, both determined as discussed above. "End lift" next occurs. A "start release" time interval begins. This period is provided to ensure that sufficient resin inflow required for the formation of the next layer has occurred. Upon the release time ending, at "end release," "start lower" occurs. This is where the part may be lowered back toward the build table to a distance comprising the previous position plus the thickness of the new layer to be created during the next exposure. When the part is back in position, at the "end lower," "start settle" occurs. Once "start settle" is complete, at "end settle," the process is back at t=0 with "start expose." The "start kick," "start lift," and "start release" are each a pause in the build process where each can be dynamically changed as desired. Each of these actions, namely the timing, is determined within the method disclosed above with respect to FIGS. 4 and 7. Timing of the lift and lower actions are further impacted by the method disclosed in FIGS. 4 and 7 as the minimum height and time to reach and return from the minimum height affect this timeline 600.

FIG. 7 shows a flow chart illustrating an embodiment of a method. The method 700 comprises creating an additive manufactured part layer by layer with an additive manufacturing device, at 710. The method 700 also comprises determining, with a processor, at least one of a speed and a rate at which the additive manufacturing device at least one of lifts, delays, and lowers the part with respect to a build plate after an additive layer has been added to the part based on sizing information about the part being built at least one of real-time during the build process and prior to beginning the build process, at 720. The method 700 further comprises operating the additive manufacturing device at one of the speed and the rate during a build process of the part to create the part, at 730.

The limitations shown in FIG. 4 and further disclosed herein may be separate dependent limitations of the method 700 shown in FIG. 7.

Figure 8:
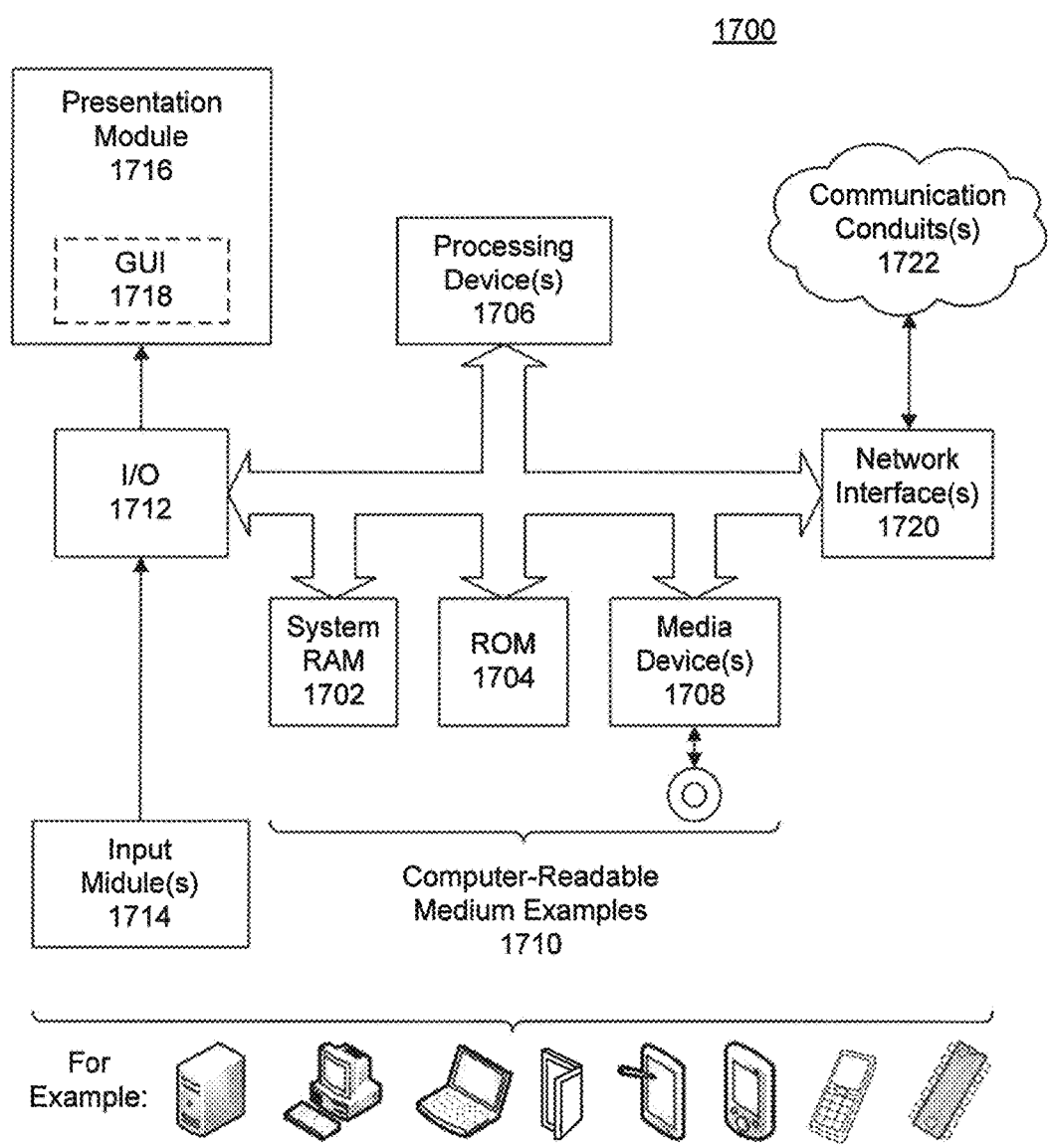
FIG. 8 shows an illustrative computing functionality that may be used to components on the additive manufacturing device.

FIG. 8 sets forth an illustrative computing functionality 1700 that may be used to components on the additive manufacturing device. The method provided in FIGS. 4-7 may be used in association with the computing functionality 1700 disclosed below. In all cases, computing functionality 1700 represents one or more physical and tangible processing mechanisms. The computing functionality 1700 may comprise volatile and non-volatile memory, such as random access memory (RAM) 1702 and read only memory ("ROM") 1704, as well as one or more processing devices 1706 (e.g., one or more central processing units (CPUs), one or more graphical processing units (Gus), and the like). The computing functionality 1700 also optionally comprises various media devices 1708, such as a hard disk module, an optical disk module, and so forth. The computing functionality 1700 may perform various operations identified above when the processing device(s) 1706 execute(s) instructions that are maintained by memory (e.g., RAM 1702, ROM 1704, and the like).

Instructions and other information may be stored on any computer readable medium 1710, including, but not limited to, static memory storage devices, magnetic storage devices, and optical storage devices. The term "computer readable medium" also encompasses plural storage devices. In all cases, computer readable medium 1710 represents some form of physical and tangible entity. By way of example, and not limitation, the computer readable medium 1210 may comprise "computer storage media" and "communications media."

"Computer storage media" comprises volatile and non-volatile, removable and non-removable media implemented in any method or technology for storage of information, such as computer readable instructions, data structures, program modules, or other data. The computer storage media may be, for example, and not limitation, RAM 1702, ROM 1704, EPSOM, Flash memory, or other memory technology, CD-ROM, digital versatile disks (DVD), or other optical storage, magnetic cassettes, magnetic tape, magnetic disk storage, or other magnetic storage devices, or any other medium which can be used to store the desired information and which can be accessed by a computer.

"Communication media" typically comprise computer readable instructions, data structures, program modules, or other data in a modulated data signal, such as carrier wave or other transport mechanism. The communication media may also comprise any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, FRO, infrared, and other wireless media. Combinations of any of the above are also included within the scope of computer readable medium.

The computing functionality 1700 may also comprise an input/output module 1712 for receiving various inputs (via input modules 1714), and for providing various outputs (via one or more output modules). One particular output module mechanism may be a presentation module 1716 and an associated graphic user interface ("GUI") 1718. The computing functionality 1700 may also include one or more network interfaces 1720 for exchanging data with other devices via one or more communication conduits 1722. In some embodiments, one or more communication buses 1724 communicatively couple the above-described components together.

The communication conduit(s) 1722 may be implemented in any manner (e.g., by a local area network, a wide area network (e.g., the Internet), and the like, or any combination thereof). The communication conduit(s) 1722 may include any combination of hardwired links, wireless links, routers, gateway functionality, name servers, and the like, governed by any protocol or combination of protocols.

Alternatively, or in addition, any of the functions described herein may be performed, at least in part, by one or more hardware logic components. For example, without limitation, illustrative types of hardware logic components that may be used include Field-programmable Gate Arrays (Fogs), Application-specific Integrated Circuits (Asics), Application-specific Standard Products (Asps), System-on-a-chip systems (Sacs), Complex Programmable Logic Devices (Colds), and the like.

The embodiment disclosed with respect to FIGS. 2 and 3 may be utilized in combination to further increase a build speed of a part. Thus, the method disclosed in FIGS. 4-7 may be further accelerated with the transparent build plate disclosed herein. This increased speed of the method disclosed in FIGS. 4-7 is realized as a time taken to remove the part from the build plate would be decreased.

The terms "module" and "component" as used herein generally represent software, firmware, hardware, or combinations thereof. In the case of a software implementation, the module or component represents program code that performs specified tasks when executed on a processor. The program code may be stored in one or more computer readable memory devices, otherwise known as non-transitory devices. The features of the embodiments described herein are platform-independent, meaning that the techniques can be implemented on a variety of commercial computing platforms having a variety of processors (e.g., set-top box, desktop, laptop, notebook, tablet computer, personal digital assistant (PDA), mobile telephone, smart telephone, gaming console, wearable device, an Internet-of-Things device, and the like).

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers, and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

The invention claimed is:

1. A system for releasing an additive manufactured part from a build location having photopolymer resin, the system comprising:
a cure inhibitor transport system to resupply a cure inhibitor at a cure inhibited photopolymer resin layer where the additive manufactured part is built so that after formation of a part layer of the part by hardening a portion of the photopolymer resin, the formed part layer rests on the cure inhibited photopolymer resin layer adjacent thereto, the transport system comprising:
a cure inhibiting reservoir comprising a film to initially hold the cure inhibitor and being stacked below the cure inhibited photopolymer resin layer comprising an uncured photopolymer resin; and
a cure inhibiting distributor layer adjacent to and stacked above the cure inhibiting reservoir through which the cure inhibitor freely passes through the film of the cure inhibitor reservoir to the cure inhibited photopolymer resin layer and into the uncured photopolymer resin to impregnate the uncured photopolymer resin with the cure inhibitor to create the cure inhibited photopolymer resin layer; and
a reference plate being optically transparent and positioned beneath and attached in stacked relation to the cure inhibiting reservoir.

2. The system according to claim 1, wherein at least a part of the reference plate provides for illumination from a curing source to pass through the reference plate and from beneath the reference plate.

3. The system according to claim 1, wherein the film is an oxygen permeable film and the cure inhibiting reservoir comprises the oxygen permeable film and an oxygen permeable coating and the cure inhibiting distributor layer comprises a plurality of channels through which the cure inhibitor passes to reach the cure inhibited photopolymer resin layer.

4. The system according to claim 1, wherein the cure inhibiting reservoir comprises polydimethylsiloxane.

5. The system according to claim 1, wherein the cure inhibiting reservoir has a durometer between Shore 00 0 and Shore A 43; and further comprising a deformable layer below the cure inhibiting reservoir and having a durometer less than a durometer of the cure inhibiting reservoir.

6. The system according to claim 1, wherein the cure inhibiting distributor layer comprises a plurality of channels through which the cure inhibitor passes to reach the cure inhibited photopolymer resin layer.

7. The system according to claim 1, wherein the cure inhibiting distributor layer comprises an amorphous fluoroplastic with an oxygen permeability of 700 Barrer and glass transition temperature of 200 degrees Celsius.

8. The system according to claim 1, wherein the cure inhibitor comprises a gas.

9. A system for constructing a three-dimensional part, the system comprising:
   a surface that provides a reference plate;
   a deformable layer adjacent to and stacked above the surface;
   a cure inhibiting reservoir adjacent to and stacked above the deformable layer and comprising a permeable film, the cure inhibiting reservoir configured to initially hold a cure inhibitor;
   a cure inhibiting distributor layer adjacent to and stacked above the cure inhibiting reservoir wherein the cure inhibiting distributor layer being stacked below an uncured photopolymer resin configured to be impregnated with the cure inhibitor within the cure inhibiting reservoir to create a cure inhibited photopolymer resin layer; and
   a securing element to hold in place the deformable layer, cure inhibiting reservoir, and cure inhibiting distributor layer to the surface.

10. The system according to claim 9, wherein the deformable layer comprises a gel with a durometer less than Shore A 45.

11. The system according to claim 9, wherein the deformable layer has a durometer less than a durometer of the cure inhibiting reservoir and a durometer of the cure inhibiting distributor layer.

12. The system according to claim 9, further comprising the cure inhibited photopolymer resin layer adjacent to and stacked above the cure inhibiting distributor layer wherein a formed part layer after formation rests on the cure inhibited photopolymer resin layer adjacent thereto.

13. The system according to claim 12, wherein the cure inhibited photopolymer resin layer is created from the cure inhibitor that initially resides in the cure inhibiting reservoir and freely passes through the film and to the cure inhibiting distributor layer and into the cure inhibited photopolymer resin layer.

14. The system according to claim 9, wherein the surface is an optically transparent surface.

15. The system according to claim 9, wherein the surface, the deformable layer adjacent to the surface, the cure inhibiting reservoir, and the cure inhibiting distributor layer each provides for illumination of a curing source to pass through.

16. The system according to claim 9, wherein the cure inhibiting reservoir comprises an oxygen permeable film with a durometer between Shore 00 0 and shore A 43.

17. The system according to claim 1, further comprising a frame located along at least one edge of the cure inhibitor transport system and the reference plate to secure the cure inhibitor transport system and the reference plate in place with respect to each other.

18. The system according to claim 9, wherein the securing element comprises a frame; the permeable film comprises an oxygen permeable film and the cure inhibiting distributor layer comprises a plurality of channels through which the cure inhibitor passes to reach the cure inhibited photopolymer resin layer.

19. The system according to claim 9, wherein the securing element holds in place the deformable layer, cure inhibiting reservoir, and cure inhibiting distributor layer to the surface along at least one edge of the deformable layer, cure inhibiting reservoir, cure inhibiting distributor layer and the surface.

\* \* \* \* \*